Patented Oct. 17, 1950

2,525,778

UNITED STATES PATENT OFFICE 2,525,778

1,4-BUT-2-YNE BIS QUATERNARY AMMONIUM HALIDES

Peter L. de Benneville, Philadelphia, Pa., and Louis H. Bock, Shelton, Wash., assignors to Rohm & Haas Company, Philadelphia, Pa., a corporation of Delaware No Drawing. Application June 29, 1949, Serial No. 102,143

7 Claims. (Cl. 260—567.6)

This invention relates to N,N,N',N'-tetraalkyl-N,N' - bisalkylbenzyl - N,N' - 2 - butynylene-1,4-bis(ammonium halides) and to a method for their preparation. These are novel quaternary ammonium salts which have utility as powerful bactericides and fungicides. They fall within the general formula

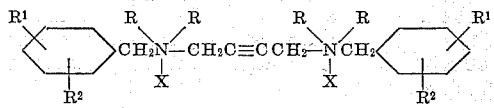

wherein R is an alkyl group of not over two carbon atoms, $R^1$ is an alkyl group of seven to ten carbon atoms, and $R^2$ is hydrogen or methyl. The peak of effectiveness is encountered when the alkyl group $R^1$ contains eight to nine carbon atoms and $R^2$ is hydrogen. X is chlorine or bromine.

These compounds are prepared by reacting together in a molar ratio of one to two a 1,4-bis-(dialkylamino) - 2 - butyne in which the alkyl group is methyl or ethyl and an alkylbenzyl halide having an alkyl group of seven to ten carbon atoms in a molar ratio of one to two. The reaction is one of addition and may be performed between about 20° and 120° C. in the presence or absence of an inert organic solvent. Suitable solvents are aromatic hydrocarbons such as benzene, toluene, and xylene, alcohols such as ethyl, isopropyl, or butyl alcohols, nitroparaffins such as nitromethane, and miscellaneous solvents such as acetonitrile and formamide.

The preparation of 1,4-bis(dialkylamino)-2-butynes is described in U. S. Patent No. 2,273,141, issued February 17, 1942. A dialkylamine and formaldehyde are first combined and then reacted with acetylene under the influence of a heavy metal catalyst from the first or second groups of the periodic table. Copper is the catalyst of first choice. The 1,4-bis(dialkylamino)-2-butyne is isolated from the reaction products. When an excess of dialkylamine and formaldehyde is used, the bis-compound becomes the principal product.

The alkylbenzyl halides which are reacted with a bis(dialkylamino) butyne are prepared in accordance with the method shown in our application Serial No. 28,274, filed May 20, 1948. An alkylbenzene or alkyltoluene in which the alkyl group contains, for purposes of the present invention, seven to ten carbon atoms is halomethylated by reaction with anhydrous formaldehyde and hydrogen chloride, or hydrogen bromide, in the presence of a catalyst mixture formed by mixing one molecular proportion of zinc chloride with 1.5 to 8 molecular proportions of an aliphatic monocarboxylic acid of one to three carbon atoms, such as formic, acetic, chloroacetic, or propionic. Acid anhydride may be used in place of these acids or in admixture therewith. Formaldehyde may be used as a gas or as a revertible polymer. The equivalent of formaldehyde and hydrogen bromide or chloride is obtained by use of a halomethyl ether. It should be noted that either hydrogen bromide or chloride can be used in the above reaction.

For one mole equivalent of alkylbenzene from one to 2.5 and preferably 1.5 to 2.5 molecular equivalents of formaldehyde are used together with 0.75 to 2.5 molecular proportions of zinc chloride associated with the proportion of monocarboxylic acid given above. Reaction temperatures of 50° to 100° C. are effective here. By this method good yields of alkylbenzyl halides are obtained with introduction almost entirely of a single halomethyl group and without formation of troublesome resinous products.

The alkylbenzene hydrocarbons which may be viewed as starting materials include both alkylbenzenes and alkyltoluenes, the former being preferred. With alkyl substituents of seven to ten carbon atoms the exact form of this group is not important. It may be of straight or branched chain structure and may be primary, secondary, or tertiary. The relative positions of alkyl group and methyl group in the alkyltoluenes is not critical. Known methods for introducing alkyl groups in benzene and toluene may be used. For example, an acyl halide may be reacted therewith and the acyl group introduced into the phenyl ring and then reduced. By other procedures olefinic hydrocarbons of the required size are reacted with benzene or toluene. The useful alkyl groups here employed vary from heptyl to decyl. The hydrocarbons which may be taken for halomethylation are heptylbenzene, heptyltoluene, octylbenzene, octyltoluene, nonylbenzene, nonyltoluene, decylbenzene, and decyltoluene in their various isomeric forms. Typical of these are (1-methylhexyl)benzene, (1-ethylpentyl)benzene, (1,3 - dimethyl - 1-propylbutyl)-benzene, (1 - methylheptyl)benzene, (2 - ethylhexyl)benzene, (1-ethylhexyl)benzene, (3,5,5-trimethyl-hexyl)benzene, (1-methylnonyl)benzene, (1-ethyloctyl)benzene, o-, m-, or p-octyltoluene, p-(1-methylheptyl)toluene, p-(1-ethylpentyl)toluene,(1 - ethyl - 3 - methylbutyl)benzene, (1,3,3-trimethylbutyl)benzene, and the like and mixtures of such hydrocarbons.

Preparation of typical quaternary ammonium salts of this invention is shown in the following examples given to illustrate this invention. Parts given are by weight. Phenol coefficients given were determined by the standard F. D. A. procedure.

PREPARATION OF TYPICAL ALKYLBENZYL HALIDES

Example A-1

To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers where then allowed to form and separated. The product layer was washed with sodium bicarbonate solution and distilled at 110°–125° C./0.07 mm. The distillate corresponded in composition to 2-ethylhexylbenzyl chloride.

Example A–2

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

Example A–3

Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

Example A–4

To a mixture of 312 parts of benzene and 180 parts of sulfuric acid was added dropwise at 10°–20° C. 281 parts of decene, which was freshly prepared by dehydration of n-decanol on alumina. The mixture was stirred for five hours at room temperature. It was then allowed to form layers. The upper layer was separated, washed with concentrated sulfuric acid twice, and distilled. The fraction distilling at 115°–127° C./1.3 mm. was identified as sec.-decylbenzene.

A mixture of 54.5 parts of this sec.-decylbenzene, 27.3 parts of zinc chloride, and 60 parts of glacial acetic acid was stirred and heated to 70°–75° C. while 28.8 parts of dichloromethyl ether was slowly added. Stirring was continued at 70°–80° C. for five hours. Layers were allowed to form. The upper layer was separated, washed with water and sodium bicarbonate solution, dried, and distilled. At 155°–175° C./1.8 mm. there was obtained a fraction of 30 parts which corresponded in composition to sec.-decylbenzyl chloride.

Example A–5

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

Example A–6

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid while the mixture was stirred and held at 5° C. The mixture was stirred for three hours with the temperature of the mixture being allowed to advance above room temperature. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and separate into layers. The upper layer was washed with water, with sodium bicarbonate solution, and with water and then distilled. At 127°–132° C./2 mm. there was obtained a fraction of 128 parts which corresponded in composition to heptylbenzyl chloride.

Example A-7

A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./1 mm. 71 parts of octylbenzyl chloride.

Example A-8

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromine. Theory for this product is 28.3%.

PREPARATION OF QUATERNARY AMMONIUM SALTS

Example B-1

There were mixed 35 parts of 1,4-bis(dimethylamino)-2-butyne, 135 parts of decylbenzyl chloride, and 400 parts of acetonitrile. The mixture was stirred for four hours at 25° C. A colorless, crystalline solid formed. It was separated by filtration and dried free of solvent. There was a yield of 90 parts of a salt which corresponded in composition to N,N,N',N'-tetramethyl-N,N'-bis(decylbenzyl)-2-butynylene-1,4-bis(ammonium chloride).

A portion of this salt was dissolved in hot water and evaluated for its action against bacteria and fungi. It inhibited the growth of spores of such common fungi as *Sclerotinia fructicola* and against *Salmonella typhosa* had a phenol coefficient of 500.

Example B-2

A mixture of 70 parts of 1,4-bis(dimethylamino)-2-butyne and 238 parts of p-(1-methylheptyl)benzyl chloride in 800 parts of acetonitrile was stirred for two hours at 25°–30° C. and left standing for about sixteen hours. A crystalline product formed. It was filtered off and dried to yield 255 parts of 1,4-but-2-yne bis(dimethylamino-p-(1-methylheptyl)benzyl ammonium chloride).

This salt is freely soluble in water at room temperature and is a powerful bactericide and fungicide. It has, for example, a phenol coefficient of 720 against *Salmonella typhosa* and of 1000 against *Staphylococcus aureus*.

Example B-3

A solution of 126 parts of 2-methyl-5-octylbenzyl chloride and 35 parts of 1,4-bis(dimethylamino)-2-butyne in 440 parts of benzene was heated under reflux for two hours. The solvent was removed by heating under reduced pressure. There was obtained a light tan solid as a residue. It corresponded fairly closely in composition to N,N,N',N'-tetramethyl-N,N'-bis(methyl-octylbenzyl)-2-butynylene-1,4-bis(ammonium chloride), having an ionizable chlorine content of 10.8% compared with the theoretical value of 11.0%.

This product was found to have a phenol coefficient against *Salmonella typhosa* of 275 and against *Staphylococcus aureus* of 580.

Example B-4

A mixture of 126 parts of p-(1-isopropyl-4-methylpentyl)-benzyl chloride and 35 parts of 1,4-bis(dimethylamino)-2-butyne was made in 220 parts of benzene and the mixture was heated for two hours under reflux. The precipitated solid was filtered and dried. It had an ionizable chlorine content of 11.1%, thus corresponding closely in composition to N,N,N',N'-tetramethyl-N,N'-bis(nonylbenzyl)-2-butynylene-1,4-bis(ammonium chloride) for which the theoretical ionizable chlorine is 11.0%.

This product was tested without further purification. It had a phenol coefficient of 585 against *Salmonella typhosa* and of 500 against *Staphylococcus aureus*.

Example B-5

The procedure of the previous preparation was repeated with 126 parts of (1,2,4,4-tetramethylpentyl)benzyl chloride. The product obtained was crystalline, amounted to 145 parts by weight, and corresponded in composition to N,N,N',N'-tetramethyl-N,N'-bis(nonylbenzyl)-2-butynylene-1,4-bis(ammonium chloride). It had a phenol coefficient of 665 against *Salmonella typhosa* and 1000 against *Staphylococcus aureus*.

Example B-6

A mixture of 150 parts of heptylbenzyl chloride, 47 parts of 1,4-bis(dimethylamino)-2-butyne and 260 parts of toluene was heated on a steam bath for three hours. Crystals formed when the reaction mixture was cooled. They were filtered off in a yield of 170 parts of a colorless salt which corresponded in composition to N,N,N',N'-tetramethyl-N,N'-bis(heptylbenzyl-2-butynylene-1,4-bis(ammonium chloride). This product had a phenol coefficient of 330 against *Salmonella typhosa* and 425 against *Staphylococcus aureus*.

Example B-7

A solution of 14 parts of 1,4-bis(dimethylamino)-2-butyne and 56.6 parts of (1-methylheptyl)-benzyl bromide was made in 200 parts of benzene. The quaternary ammonium bromide began to precipitate almost at once. Nevertheless, the solution was heated under reflux for ten minutes. It was cooled and filtered, yielding 60 parts of crystalline product which corresponded in composition to N,N,N',N'-tetramethyl-N,N'-bis(octylbenzyl)-2-butynylene-1,4-bis(ammonium bromide). This product has a phenol coefficient of 470 against *Salmonella typhosa* and of 1000 against *Staphylococcus aureus*.

The 1,4-bis(diethylaminomethyl)-2-butyne is prepared in the same way as 1,4-bis(dimethylaminomethyl)-2-butyne used in the above examples. It may replace the latter on a molar basis and yields N,N,N',N'-tetraethyl-N,N'-bis-(alkylbenzyl)-2-butynylene-1,4-bis(ammonium halides) which are almost identical with the tetramethyl analogues shown above. The preparation of typical tetraethyl derivatives follows.

*Example B-8*

There was prepared 1,4-bis(diethylamino)-2-butyne by reaction of diethylamine, formaldehyde, and acetylene in the presence of a copper catalyst. There were taken 39.2 parts of 1,4-bis-(diethylamino)-2-butyne, 113.2 parts of octylbenzyl bromide, and 300 parts of acetonitrile. These materials were mixed and heated together under reflux for 5.5 hours. The acetonitrile was distilled by heating at 95° C. under reduced pressure. There was obtained 122 parts of a reddish, brittle solid which was soluble in cold water. It corresponded in composition to 1,4-but-2-yne bis(octylbenzyl diethyl ammonium bromide) or N,N,N',N'-tetraethyl-N,N'-bis(octylbenzyl)-2-butynylene-1,4-bis(ammonium bromide).

This compound has a phenol coefficient of 350 against *Salmonella typhosa* and of 750 against *Staphylococcus aureus*.

*Example B-9*

There were mixed 100.8 parts of nonylbenzyl chloride, 39.2 parts of 1,4-bis(diethylamino)-2-butyne, and 300 parts of acetonitrile. This mixture was heated under reflux for eight hours. The acetonitrile was then stripped off by heating under reduced pressure. There was obtained 103 parts of a solid which corresponded in composition to N,N,N',N'-tetraethyl-N,N'-bis(nonylbenzyl)-2-butynylene-1,4-bis(ammonium chloride).

The phenol coefficient of this compound is 470 against *Salmonella typhosa* and 710 against *Staphylococcus aureus*.

In a manner like that described in the above examples there was prepared 1,4-bis(dibutylamino)-2-butyne. This was reacted with nonylbenzyl bromide to give N,N,N',N'-tetrabutyl-N,N'-bis(nonylbenzyl)-2-butynylene-1,4-bis(ammonium bromide). This product was found to have a phenol coefficient of 350 against *Salmonella typhosa*.

The effectiveness of the compounds may also be demonstrated by reference to the bacteriostatic and bactericidal values which are determined by the greatest dilutions of which they remain positively bacteriostatic or bactericidal against a variety of Gram-positive and Gram-negative organisms in a culture broth. The determinations were made by a successive dilution method in which trypticase-soy was utilized. A one per cent aqueous solution of a compound under test was diluted with broth and the various dilutions prepared autoclaved for ten minutes at 10 to 12 pounds pressure. The dilutions were cooled and inoculated with a 4 mm. loopful of a culture of a test organism. Incubation was carried out for 24 hours at 37° C. The highest dilution showing no growth gave the dilution for the bacteriostatic value. After an additional period of incubation of 24 hours at 37° C. subcultures were made by transferring three loopfuls from cultures showing no growth to fresh broth. The subcultures were incubated 48 hours at 37° C. The highest dilution showing no growth was taken as the bactericidal value. Data thus determined for N,N,N',N'-tetramethyl-N,N'-bis[(1-methylheptyl)benzyl]-N,N'-2-butynylene-1,4-bis(ammonium chloride) are summarized in Table I, where Bs indicates the bacteriostatic value and Bc the bactericidal value.

TABLE I

*Evaluation for bacteriostatic and bactericidal values of a typical salt of this invention*

| Organism | Gram-type | Effective Dilutions/1000 | |
|---|---|---|---|
| | | Bs | Bc |
| S. aureus | + | 640 | 320 |
| S. pyogenes | + | 4,000 | 2,000 |
| S. fecalis | + | 640 | 40 |
| N. catarrhalis | − | 4,000 | 1,000 |
| S. typhosa | − | 320 | 160 |
| Ps. aeruginosa | − | 40 | 10 |
| P. vulgaris | − | 20 | 10 |
| C. welchii | − | 40 | 40 |
| B. suis | − | 1,000 | 320 |

It will be noted that against some organisms, both gram-positive and gram-negative, this compound is effective at dilutions of one part per million or more. Even against very resistant gram-negative organisms these compounds were effective at dilutions of 1 in 10,000 to 1 in 40,000.

We claim:
1. As new chemical substances, compounds of the formula

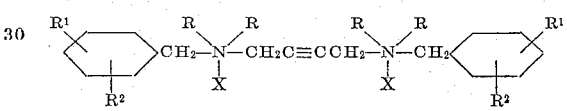

wherein R is an alkyl group of not over two carbon atoms, $R^1$ is an alkyl group of seven to ten carbon atoms, $R^2$ is a member of the class consisting of hydrogen and the methyl group, and X is a member of the class consisting of chlorine and bromine.

2. As new chemical substances, compounds of the formula

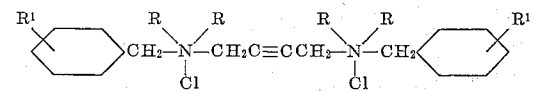

wherein R is an alkyl group of not over two carbon atoms and $R^1$ is an alkyl group of seven to ten carbon atoms.

3. As new chemical substances, compounds of the formula

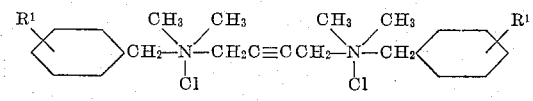

wherein $R^1$ is an alkyl group of seven to nine carbon atoms.

4. A compound of the formula of claim 3 wherein the alkyl group is 1-isopropyl-4-methylpentyl.

5. A compound of the formula of claim 3 wherein the alkyl group is 1,2,4,4-tetramethylpentyl.

6. As new chemical substances, compounds of the formula

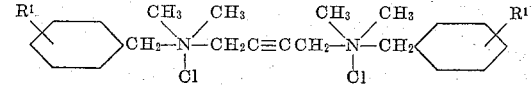

wherein $R^1$ is an alkyl group of eight carbon atoms.

7. A compound of the formula of claim 6 wherein the alkyl group is 1-methylheptyl.

PETER L. DE BENNEVILLE.

No references cited.